Patented Aug. 10, 1948

2,446,662

UNITED STATES PATENT OFFICE 2,446,662

CHROMIUM COMPLEXES OF PYRAZOLONE AZO DYES

Abby Ware Nies, Bound Brook, N. J., assignor to American Cyanamid Company, New York, N. Y., a corporation of Maine No Drawing. Application September 9, 1944, Serial No. 553,456

7 Claims. (Cl. 260—147)

This invention relates to new chromium complexes of azo dyestuffs, which latter are derived from 1-phenyl-2,3-dimethyl-4-amino-5-pyrazolone (4-amino antipyrine), and are represented by the following formula:

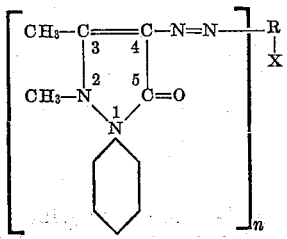

in which R—X is a residue of a coupling component, and X stands for a hydroxy or amino group ortho to the azo group. $n$ may be either 1 or 2.

The chromium complexes which form the subject matter of the present invention are particularly useful for the dyeing of basic nitrogenous fibers where the coupling component contains a sulfonic acid or similar group which has affinity for the material to be dyed. The colors show excellent fastness and have many desirable shades, for example, greens, which are of importance in the dyeing of many fabrics.

The dyestuffs of the present invention are quite unusual because they are not of the type which normally form chromium complexes. There is only one hydroxy or amino group ortho to the azo bridge. The pyrazolone contains only a keto group as there are no carbon or nitrogen atoms with attached hydrogen which would permit enol formation. Such a keto group normally will not produce stable complexes with chromium.

The dyestuffs of the present invention are very stable and can be practically used for dyeing wool and other basic nitrogenous fabrics. The reason for this unexpected stability is not known and it is not desired to limit the invention to any theory of action. The following explanation is merely advanced as one which is possible and which might explain the otherwise anomalous behavior of the dyes in metallization. It is possible that the antipyrine portion of the azo dye may be present, or transformable into, a form which possesses a structure somewhat similar to the betaines and that the dyestuff or a portion of it is in this form during metallization. The betaine form might be represented by the following formula:

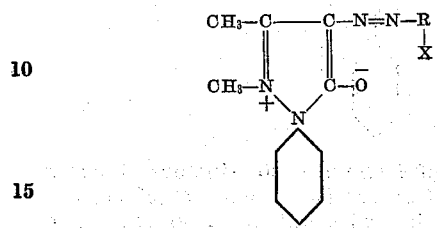

The coupling components which may be used in forming the dyestuffs which are metallized are large in number and it is an advantage of the present invention that a wide choice of coupling components and therefore dye characteristics is available. The following are a few typical coupling components: 2-naphthol; 2-naphthol-4-sulfonic acid; 2-naphthol-3-carboxylic acid; 2-naphthol-3,6-disulfonic acid; 2-naphthol-8-sulfonic acid; 1 naphthol-8-sulfonic acid, 1-amino-8-naphthol-4-sulfonic acid; 2-naphthylamine; 2-naphthylamine - 3,6 - disulfonic acid; 5,5′- dihydroxy - 2,2′- dinaphthylamine - 7,7′- disulfonic acid; acetoacetic acid-anilide; acetoacetic acid-p-sulfanilide; 1-phenyl-3-methyl-5 - pyrazolone; 1-(4′-sulfophenyl) - 3 - methyl-5-pyrazolone; resorcinol; meta - phenylenediamine; mono - azo dyestuffs derived from such coupling components as are capable of coupling twice, and the like.

Metallization may be carried out by the customary methods, for example, by refluxing or heating under pressure aqueous solutions or suspensions of the azo dyestuffs with salts or other suitable compounds containing trivalent chromium. It is an advantage of the present invention that no new metallization techniques are required, and that the reaction proceeds smoothly. I find that there is some advantage in metallizing in mineral acid solution at an elevated temperature, for example, by boiling.

Upon completion of metallization, the dyestuffs are isolated by filtration if of limited solubility.

Others are more soluble and may be precipitated from their aqueous solution by addition of salting agents, filtered and dried.

Most of the new products of the present invention are yellow to orange to brown powders, some of which are quite soluble in water. Those of limited solubility are generally dissolved readily in dilute sodium carbonate solution. They dye wool from acidic baths level shades of excellent fastness properties. Among the products of the present invention are those which dye wool novel green to olive shades.

The following examples are given to more fully illustrate the products of the present invention and not by way of limitation. All parts are by weight unless otherwise noted. Where formulae are given in the examples of dyes having acid groups the formula represents the free acid. In some of the examples containing tables, for compactness certain synthetic nitrogenous fibers are given under their trade names of "Aralac," which is a fiber derived from casein, and "nylon," which is used in the customary general sense as applying to various linear polyamide superploymers.

*Example 1*

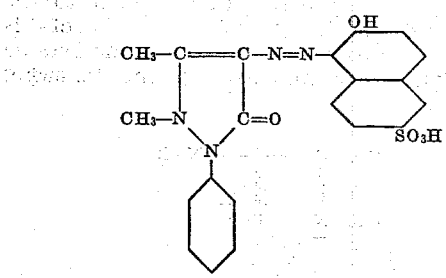

20.3 parts of 4-amino antipyrine are dissolved in 250 parts of water with the addition of 50 parts of 21% sulfuric acid solution. After cooling to 5°–10° C., 6.9 parts of sodium nitrite dissolved in 100 parts of water are added.

The acidic solution of 4-diazo antipyrine is warmed to 60° C. and 26 parts of the sodium salt of 2-naphthol-6-sulfonic acid are added. The coupling is heated to 70° C. and stirred at 70° C. until complete. The azo dyestuff, consisting of red-brown needles, insoluble in the coupling mixture is isolated by filtration, washed with water and dried.

The dye in powder form is red-brown, giving an orange solution with 5% sodium carbonate solution and a red-orange solution in concentrated sulfuric acid.

*Example 2*

5 parts of the azo dyestuff described in Example 1 are dissolved in 5,000 parts of hot water with the addition of 0.5 part of anhydrous sodium carbonate, 50 parts of anhydrous sodium sulfate are added and the solution diluted with 25,000 parts of water. 20 parts of acetic acid are added. Then 500 parts of wool which have been made wet are added and the dye bath boiled for a half hour. 20 parts more of acetic acid are then added and boiling continued for a half hour. The shade of the wool at this point is a yellow-orange.

Then 5 parts of sodium dichromate are added and the dye bath boiled a half hour. The wool is then removed, washed with water and dried. The shade of the wool is a yellow-red of good fastness.

*Example 3*

43.8 parts of the dyestuff described in Example 1 are mixed with 1,750 parts of water. 190 parts of basic chromic acetate solution containing 11 parts of chromium and 75 parts of 90% formic acid are added. The mixture is then heated to boiling and boiled for sixteen hours. The metallized dye is then isolated, after cooling, by filtration, washed with water and dried.

In powder form, it is dark red, dissolving in hot 1% sodium carbonate solution with an orange color and in concentrated sulfuric acid with a brownish orange color.

*Example 4*

5 parts of the metallized dye prepared in Example 3 are dissolved in 5,000 parts of hot water with the addition of 1.5 parts of anhydrous sodium carbonate. The solution is diluted with 25,000 parts of water and 40 parts of 10% sulfuric acid. In this solution are placed 500 parts of wool which has been made wet. The dye bath is boiled one and a half hours. The wool is then removed, washed with water and dried. The dyeings are a yellow-pink shade of good fastness to light, washing and fulling.

*Example 5*

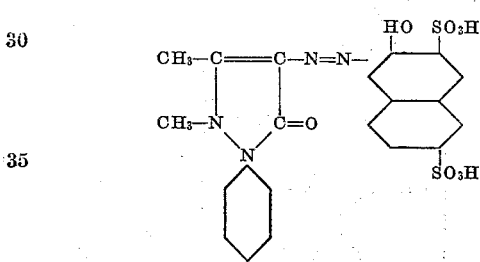

20.3 parts of 4-amino antipyrine are dissolved in 250 parts of water with 50 parts of 21% sulfuric acid. After cooling to 5°–10° C., 6.9 parts of sodium nitrite dissolved in 100 cc. are added. To this solution of 4-diazo antipyrine are added 38.3 parts of the disodium salt of 2-naphthol-3,6-disulfonic acid. The coupling is stirred several hours at 40°–60° C. until complete. The dye is then isolated by filtration, washed with 20% common salt solution and dried.

It is red in powder form, forming a yellow-orange solution with water, a red-orange solution with 10% sodium carbonate solution and a yellow-red solution with concentrated sulfuric acid.

When dyed on wool using the method of Example 2, it gives a reddish orange shade which upon addition of sodium dichromate and further boiling changes to a blue tone red of good fastness.

*Example 6*

51.9 parts of the dyestuff prepared in Example 5 are heated at reflux for one hour with 3,000 parts water and 179 parts of basic chromic acetate solution containing 10.4 parts of chromium. At the end of the hour, 300 parts of 5% sulfuric acid are added and boiling continued for 16 hours. After cooling, the metallized dye is isolated by filtration, washed with water and dried.

It is brown in powder form, soluble to a brownish orange in concentrated sulfuric acid and to an orange in 10% sodium carbonate solution.

When dyed on wool as described in Example 4, a level bright yellow tone red is obtained which has very good fastness to light.

Example 7

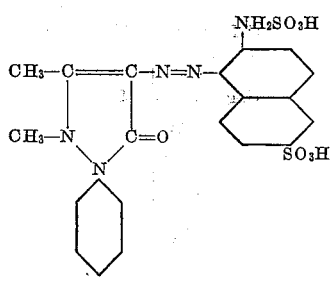

20.3 parts of 4-amino antipyrine are dissolved in 250 parts of water with the addition of 50 parts of 21% sulfuric acid solution. After cooling to 5°–10° C., 6.9 parts of sodium nitrite dissolved in 100 parts of water are added. To the acidic solution of diazo are added 43.4 parts of the disodium salt of 2-naphthylamine-3,6-disulfonic acid. The coupling is warmed at 40° C. and stirred at 40° C. until complete. The dyestuff is isolated by diluting with 125 parts of 20% common salt solution, filtering and washing with 20% salt solution and dyeing.

In powder form the dyestuff is violet in color dissolving both in 5% sodium carbonate solution and in concentrated sulfuric acid with a reddish yellow color and in water with a red color.

When dyed using the procedure described in Example 2, a yellow shade is first obtained on wool which upon adding sodium dichromate and boiling changes to a bright olive green shade of improved fastness to light.

Example 8

51.8 parts of the dyestuff described in Example 7 are dissolved in 3,000 parts of water. To the solution are added 350 parts of basic chromic acetate solution containing 20.8 parts of chromium. The mixture is heated at slow reflux for one hour at the end of which time 40 parts of 5% sulfuric acid solution are added. Boiling is continued for 19 hours and then the slurry of metallized dye crystals cooled. The dye is isolated by filtration, washed with water and dried.

In powder form the metallized dyestuff is a blue-green, soluble in hot 5% sodium carbonate solution to give a blue-green color. It dissolves in concentrated sulfuric acid giving a yellow color.

When dyed on wool as described in Example 4, a green shade of good fastness to light is obtained.

Example 9

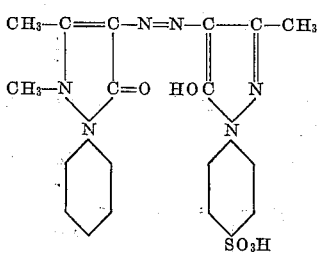

20.3 parts of 4-amino antipyrine are dissolved in 250 parts of water upon addition of 50 parts of 21% sulfuric acid. After cooling to 5°–10° C., 6.9 parts of sodium nitrite dissolved in 100 parts of water are added. To the acidic solution of 4-diazo antipyrine are added 26.7 parts of 1-(4'-sulfophenyl)-3-methyl-5-pyrazolone in solid form. The coupling mixture is heated to 60°–65° C. and stirred at 60°–65° C. until coupling is complete. After cooling, the dyestuff is isolated by filtration, washed with water and dried.

It is light orange in powder form, dissolving in hot water to give an orange solution, in 10% sodium carbonate to give a greenish yellow solution and in concentrated sulfuric acid to give a greenish yellow color.

When dyed according to the procedure described in Example 2, a reddish yellow shade is first obtained which, upon addition of sodium dichromate and boiling, changes to a greenish yellow of good fastness to light.

Example 10

46.9 parts of the azo dyestuff prepared in Example 9 are added to a mixture of 3,000 parts of water and 358 parts of a basic chromic acetate solution containing 20.8 parts of chromium. The mixture is then heated to boiling and boiled for one hour. Then 2,000 parts of water and 300 parts of 5% sulfuric acid are added and the boiling continued for 18 hours. After cooling, the metalized dye is isolated by filtration, washed with water and dried.

The dry metallized dyestuff is a light brown powder, soluble in 5% sodium carbonate solution giving a yellow color and soluble in concentrated sulfuric acid giving a green-yellow color.

When dyed on wool using the procedure described in Example 4, a level yellow shade of good fastness to light is obtained.

Example 11

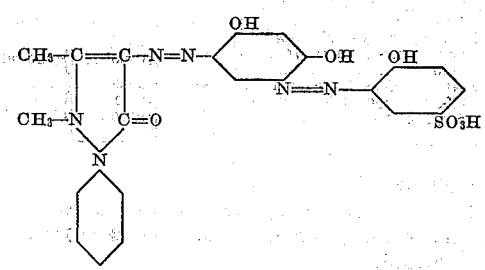

20.3 parts of amino antipyrine are dissolved in 100 parts of water with the addition of 245 parts of 10% sulfuric acid solution. After cooling to 5° C. with ice, 6.9 parts of sodium nitrite, dissolved in 100 parts of water, are added. Then 11.0 parts of resorcinol are added to the solution of diazo and the coupling stirred until complete. The monoazo dyestuff is then isolated by filtration, washed with water and dried.

32.4 parts of the monoazo dyestuff are dissolved in 100 parts of 10% sodium hydroxide solution. 10.6 parts of anhydrous sodium carbonate are added and the mixture cooled to 15° C. with ice. Then 20.8 parts of 2-amino-1-phenol-4-sulfonic acid, diazotized in the usual manner, are added and the coupling stirred until complete. Concentrated hydrochloric acid is then added until the mixture gives an acid test when spotted on Standard Congo Red indicator paper. The precipitated dye is isolated by filtration, washed with acidified water and dried.

The disazo dyestuff is a greenish black powder, difficultly soluble in cold water, soluble in 10% sodium carbonate solution giving a violet-black color and in concentrated sulfuric acid in which it is a very dark red.

When dyed according to the method of Example 2, a reddish brown shade is obtained on wool or nylon, which when treated with sodium dichromate becomes a full black of very good fastness to light and washing.

*Example 12*

52.4 parts of the disazo dyestuff prepared as described in Example 10 are added to 1,500 parts of water. Then 450 parts of chromic acetate solution containing 15.6 parts of chromium are added. The mixture is heated to boiling and boiled for four hours. Then 200 parts of 90% formic acid are added and the mixture heated an additional twenty hours. The temperature is then reduced and the metallized dye isolated by filtration and dried.

In powder form, the metallized dyestuff is black, dissolving in 5% sodium carbonate solution to give a violet-black color and in concentrated sulfuric acid to give a red-brown color.

When dyed according to the procedure described in Example 4, black shades of improved fastness to light are obtained on wool.

Chromium complexes of additional dyestuffs and shades obtained on various fibers are set out in the following table:

| Azo Combination, Diazotized 4-Amino Antipyrine Coupled to— | Heavy Metal Compound | | |
|---|---|---|---|
| | Metal Present | Fiber Dyed | Shade of Dyeing |
| 1. 1-Naphthylamine-4-sulfonic acid | Cr | wool, Aralac | green. |
| 2. 2-Naphthylamine-6-sulfonic acid | Cr | wool | olive green. |
| 3. 2-Naphthylamine-5,7-disulfonic acid | Cr | do | green. |
| 4. 5,5'-Dihydroxy-2,2'-dinaphthylamine-7,7'-disulfonic acid | Cr | wool, nylon | blue-red. |
| 5. 2-Naphthol-6-sulfonic acid | Cr | leather | red. |
| 6. 1-(4'-sulfophenyl)-3-methyl-5-pyrazolone | Cr | wool, nylon | yellow. |

I claim:
1. Chromium complexes of azo dyes selected from the group consisting of monoazo dyes having the formula:

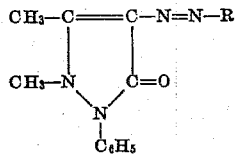

in which R is the radical of a coupling component selected from the group consisting of acetoacetic arylides, pyrazolones, and compounds of the benzene and naphthalene series substituted ortho to the azo linkage by a substituent selected from the group consisting of amino and hydroxy and disazo dyestuffs having the formula:

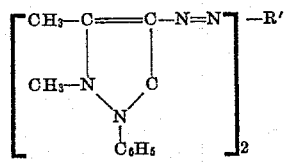

in which R' is a radical of a coupling component of the benzene and naphthalene series substituted ortho to the azo linkages by substituents selected from the group consisting of amino and hydroxy.

2. Chromium complexes of azo dyestuffs represented by the formula:

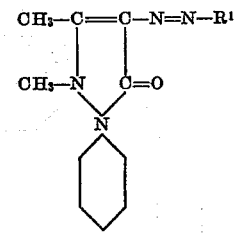

wherein $R^1$ is the radical of a 5-pyrazolone capable of coupling in the 4 position.

3. Chromium complexes of azo dyestuffs represented by the formula:

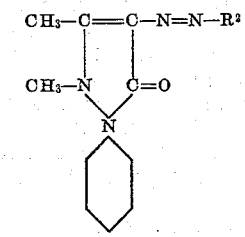

wherein $R^2$ is the radical of a naphthylamine sulfonic acid linked by the azo bridge in ortho position to the amino group.

4. Chromium complexes of azo dyestuffs represented by the formula:

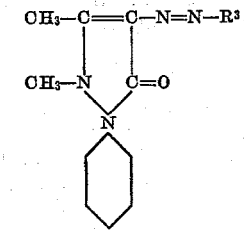

wherein $R^3$ is the radical of a naphthol sulfonic acid linked by the azo bridge in ortho position to the hydroxyl group.

5. Chromium complexes of the azo dyestuff of the formula:

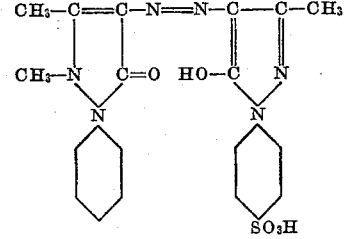

6. Chromium complexes of the azo dyestuff of the formula:

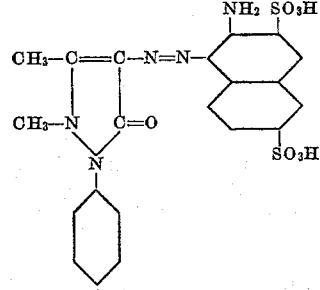

7. Chromium complexes of the azo dyestuff of the formula:
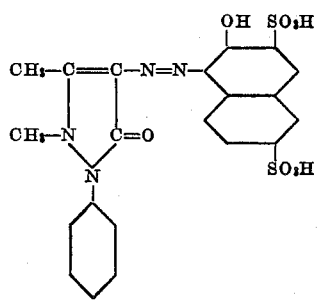
ABBY WARE NIES.
REFERENCES CITED
The following references are of record in the file of this patent:
Morgan et al., "Chem. Soc. Jour.," vol. 103, pages 808–816, pages 1494–1503 (1913).
Beilstein, vol. 24, 1st suppl., page 302, vol. 24, pages 332, 216, vol. 25, page 554.